United States Patent
Datar et al.

(10) Patent No.: US 9,424,479 B2
(45) Date of Patent: *Aug. 23, 2016

(54) SYSTEMS AND METHODS FOR RESIZING AN IMAGE

(71) Applicant: Google Inc., Mountain View, CA (US)

(72) Inventors: Mayur Datar, Cupertino, CA (US); Huei-Hung Christopher Liao, Sunnyvale, CA (US); Vivek Kwatra, Santa Clara, CA (US); Allen Huang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,423

(22) Filed: Oct. 17, 2014

(65) Prior Publication Data

US 2015/0036947 A1    Feb. 5, 2015

Related U.S. Application Data

(63) Continuation of application No. 13/749,564, filed on Jan. 24, 2013, now Pat. No. 8,873,887.

(51) Int. Cl.
| | | |
|---|---|---|
| G06K 9/32 | (2006.01) | |
| G06K 9/18 | (2006.01) | |
| G06T 3/00 | (2006.01) | |

(52) U.S. Cl.
CPC .............. *G06K 9/18* (2013.01); *G06T 3/0012* (2013.01)

(58) Field of Classification Search
None
See application file for complete search history.

(56) References Cited

U.S. PATENT DOCUMENTS

| | | | |
|---|---|---|---|
| 7,747,107 B2 | 6/2010 | Avidan et al. | |
| 7,787,664 B2 | 8/2010 | Luo et al. | |
| 7,873,211 B1 | 1/2011 | Grundmann et al. | |
| 8,270,765 B1 | 9/2012 | Avidan et al. | |
| 8,270,766 B1 | 9/2012 | Avidan et al. | |
| 8,280,191 B1 | 10/2012 | Avidan et al. | |
| 8,290,300 B2 * | 10/2012 | Avidan et al. | 382/284 |

(Continued)

FOREIGN PATENT DOCUMENTS

| | | |
|---|---|---|
| JP | 2010-187376 A | 8/2010 |
| KR | 10-2011-0091700 A | 8/2011 |
| WO | WO-2011/088542 A1 | 7/2011 |

OTHER PUBLICATIONS

Achanta, Radhakrishna, and Sabine Susstrunk. "Saliency Detection for Content-Aware Image Resizing." Image Processing (ICIP), 2009 16th IEEE International Conference on IEEE, 2009.

(Continued)

*Primary Examiner* — Li Liu
(74) *Attorney, Agent, or Firm* — Foley & Lardner LLP; John D. Lanza

(57) ABSTRACT

In some instances, an image may have dimensions that do not correspond to a slot to display the image. For example, an image content item may have dimensions that do not correspond to a content item slot. The image may be resized using seam carving to add or remove pixels of the image. A saliency map for the image may be used having saliency scores for each pixel of the image. Evaluation metrics may be used before, during, and after, seam carving to determine whether salient content is affected by the seam carving. In some instances, a seam cost threshold value may be used for adaptive step size during the seam carving. The resized image may then be outputted, such as for an image content item to be served with a resource.

19 Claims, 9 Drawing Sheets

(56) References Cited

U.S. PATENT DOCUMENTS

| | | | |
|---|---|---|---|
| 8,963,960 B2* | 2/2015 | Gilra | 382/298 |
| 9,042,648 B2* | 5/2015 | Wang et al. | 382/173 |
| 2008/0253685 A1 | 10/2008 | Kuranov et al. | |
| 2009/0003712 A1 | 1/2009 | Mei et al. | |
| 2010/0013827 A1 | 1/2010 | Fillion et al. | |
| 2010/0124371 A1 | 5/2010 | Jiang et al. | |
| 2010/0142853 A1* | 6/2010 | Fillion et al. | 382/298 |
| 2010/0183242 A1 | 7/2010 | Brand | |
| 2010/0201711 A1 | 8/2010 | Fillion et al. | |
| 2011/0085745 A1 | 4/2011 | Kumar et al. | |
| 2011/0091132 A1 | 4/2011 | Kumar et al. | |
| 2011/0182502 A1 | 7/2011 | Liang | |
| 2011/0200274 A1 | 8/2011 | Luo et al. | |
| 2011/0211771 A1 | 9/2011 | Rubenstein et al. | |
| 2012/0099794 A1* | 4/2012 | Peeters et al. | 382/190 |
| 2012/0120311 A1 | 5/2012 | De Haan | |
| 2012/0121204 A1 | 5/2012 | Ding et al. | |
| 2013/0084020 A1 | 4/2013 | Conger et al. | |
| 2013/0114864 A1* | 5/2013 | Garcia et al. | 382/118 |
| 2014/0028727 A1 | 1/2014 | Ragozin et al. | |

OTHER PUBLICATIONS

Avidan, S., et al. "Seam Carving for Content-Aware Image Resizing," International Journal of Computer Vision, Sep. 2004, pp. 1-26, vol. 59, No. 2.

Felzenszwalb, P., "Efficient Graph-Based Image Segmentation," International Journal of Computer Vision, Sep. 2004, pp. 1-26, vol. 59, No. 2.

Hwang, Daw-Sen, and Shao-Yi Chien. "Content-Aware Image Resizing Using Perceptual Seam Carving with Human Attention Model." Multimedia and Expo, 2008 IEEE International Conference on IEEE, 2008.

International Search Report and Written Opinion of PCT/US2013/070988 DTD Mar. 18, 2014, 9 pages.

Kang, H. et al., "Flow-Based Image Abstraction," IEEE Transactions on Visualization and Computer Graphics, Jan./Feb. 2009, pp. 62-76, vol. 15, No. 1.

Kwatra et al., "Discontinuous Seam-Carving for Video Retargeting," IEEE CVPR, 2010, 8 pages.

Rubinstein, M., et al., "Improved Seam Carving for Video Retargeting," Transactions on Graphics ACM SIGGRAPH, 2007, pp. 109.

Shamir, Ariel, and Shai Avidan. "Seam Carving for Media Retargeting." Communications of the ACM 52.1 (2009): 77-85.

US Notice of Allowance on U.S. Appl. No. 13/749,564 DTD Jul. 3, 2014, 9 pages.

Winnemoeller, H., et al. "Real-time Video Abstraction," ACM Transactions on Graphics—TOG, 2008, 6 pages.

Wolf, L., et al., "Non-homogeneous Content-driven Video-retargeting," In Proceedings of the Eleventh IEEE International Conference on Computer Vision (ICCV '07), 2007, pp. 1-6.

International Preliminary Report on Patentability on PCT/US2013/070988, Mailed Aug. 6, 2015, 6 pgs. [098981-1355].

* cited by examiner

800 | Discover the earlier version of the Mona Lisa by da Vinci

810 | Discover the earlier version of the Mona Lisa by da Vinci

810 | Discover the earlier version of the Mona Lisa by da Vinci

SYSTEMS AND METHODS FOR RESIZING AN IMAGE

CROSS-REFERENCE TO RELATED PATENT APPLICATIONS

This application is a Continuation of U.S. application Ser. No. 13/749,564, filed Jan. 24, 2013, incorporated herein by reference in its entirety.

BACKGROUND

In a networked environment, such as the Internet or other networks, first-party content providers can provide information for public display on resources, for example web pages, documents, applications, and/or other resources. The first-party content can include text, video, and/or audio information provided by the first-party providers via, for example, a content server for display on the Internet. Additional third-party content can also be provided by third-party content providers for display on the resources together with the first-party content provided by the first-party providers. Thus, a person viewing a resource can access the information that is the subject of the resource, as well as the third-party content that may or may not be related to the subject matter of the resource.

SUMMARY

A method for resizing an image may include receiving data for the image, a seam cost threshold value, and a step size. A saliency map for the image may be made based on the data for the image. A first set of seams for the image may be determined based on the saliency map with each seam of the first set of seams having a saliency cost below a seam cost threshold value. The image may be resized using a first set of resizing seams to generate a second image. The first set of resizing seams include a number of seams equal the minimum between the number of seams of the first set of seams and the step size. A second set of seams for the second image may be determined with each seam of the second set of seams having a saliency cost below the seam cost threshold value. The second image may be resized using a second set of resizing seams to generate a resized image. The second set of resizing seams include a number of seams equal to the minimum between the number of seams of the second set of seams and the step size. Display data to effect display of the resized image may be outputted.

A computer readable storage device may store instructions that, when executed by a data processor, may cause the data processor to perform several operations. The operations may include receiving a request from a requesting device for a content item to be displayed with a resource. A content item comprising an image having several pixels may be selected. A saliency score for each pixel may be determined based on a gradient saliency value, a color spatial distribution saliency value, and a logo detection value. An average saliency value for the image may be determined based on the saliency scores. A first set of seams for the image may be determined based on the saliency scores if the average saliency value is below an average threshold value. The image may be resized based on the first set of seams. A total cost value for the first set of seams may be determined and display data to effect display of the resized image as the content item may be outputted if the total cost value is below a minimum cost threshold value.

A system for resizing an image content item of a third-party content provider may include a data processor and a computer readable storage device storing several instructions that, when executed by the data processor, cause the data processor to perform various operations. The operations may include receiving data for an image having several pixels, a seam cost threshold value, and a step size. A saliency map for the image may be determined and may include a saliency score for each pixel of the image. An average saliency value for the image may be determined based on the saliency scores. A first set of seams for the image may be determined based on the saliency scores if the average saliency value is below an average threshold value. Each seam of the first set of seams may have a saliency cost below the seam cost threshold value. The image may be resized based on a first set of resizing seams to generate a second image. The first set of resizing seams may include a number of seams equal to the minimum between a number of seams of the determined first set of seams and the step size. A second set of seams for the second image may be determined. The second image may be resized based on the second set of seams to generate a resized image. Display data to effect display of the resized image may be outputted.

BRIEF DESCRIPTION OF THE DRAWINGS

Various implementations taught herein are illustrated by way of example, and not by way of limitation, in the figures of the accompanying drawings, in which.

Figure 1:
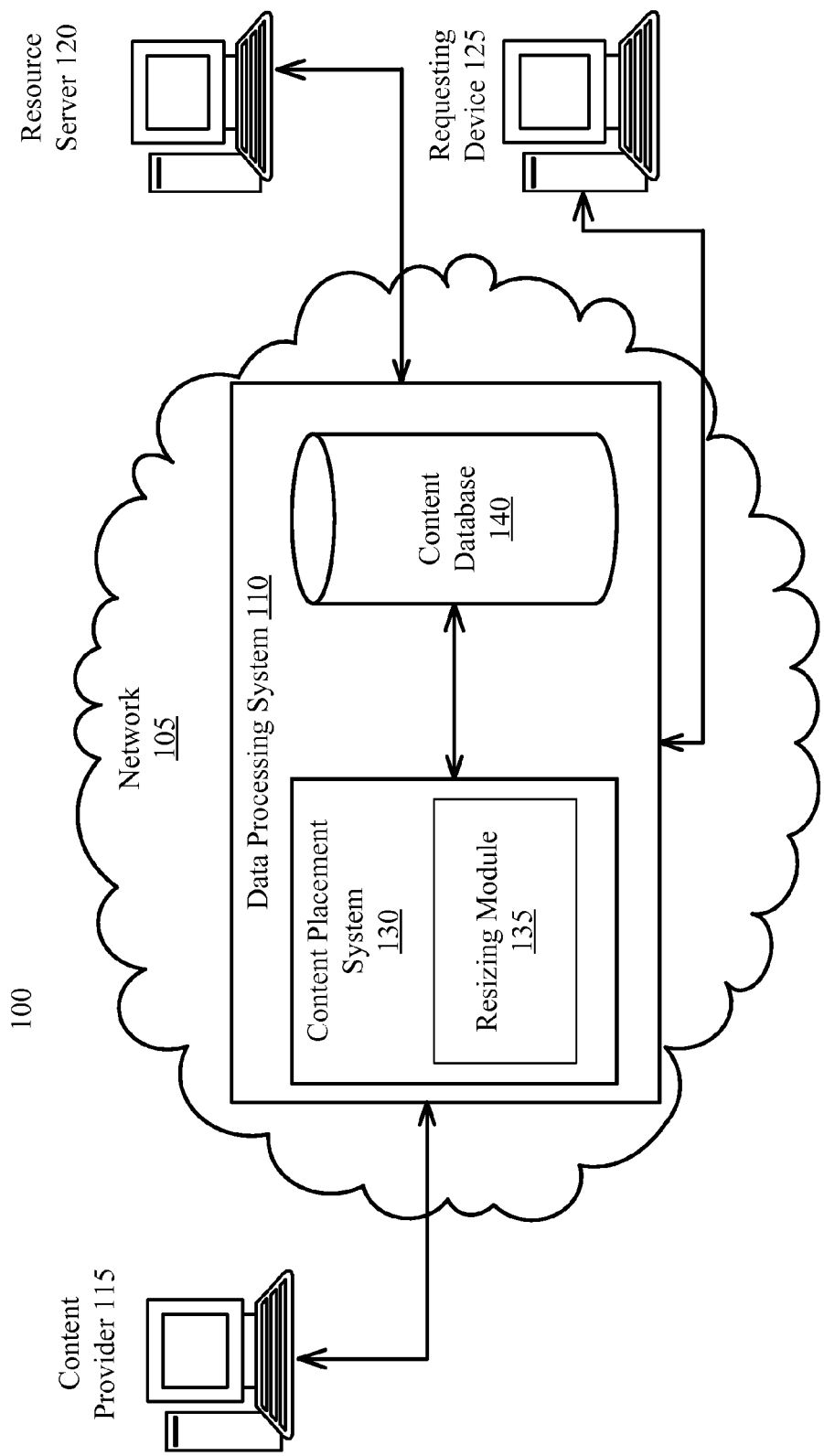
FIG. 1 is an overview depicting an example system of providing information via a computer network.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various aspects discussed in greater detail below may be implemented in any of numerous ways, as the described aspects are not limited to any particular manner of implementation. Examples of specific implementations and applications are provided primarily for illustrative purposes.

In some instances, it may be useful to resize a content item, such as an image and/or video. For example, a computing device (e.g., a user device or requesting device) can view a resource, such as a web page, via the Internet by communicating with a server, such as a web page server, corresponding to that resource. The resource may include content that is the subject of the resource from a first party provider, as well as additional third-party provided content, such as advertisements. In one implementation, responsive to receiving a request to access a web page, a web page server can communicate with a data processing system, such as a content placement system, to request a content item for insertion into the rendering of the web page displayed at the computing device. The content placement system can select the appropriate content item and provide it to the web page server for display with the web page.

In some instances, a slot of the resource may have a set of dimensions that are different from the selected content item. In such instances, it may be useful to resize the content item to fit the slot, such as removing portions of the content item and/or adding additional pixels to the content item. Such resizing may be accomplished by utilizing a technique such as seam carving. Seam carving selects a series of connected pixels of the content item to duplicate and/or remove depending on the resizing desired. For content items, it may be useful to select seams that do not distort the primary or salient content of the content item. By way of example, a content item may include textual content on a background. Seams may be selected to preserve the textual content and/or character spacing while resizing the content item, thereby providing a resized content item, but preserving the salient content. In other instances, the content item may include faces such that facial detection may be useful to preserve the facial content. In still other instances, logos may be present in the content item such that preserving the shape and size of the logo may be useful as well. Still other salient content considerations will be discussed in greater detail herein.

Such preservation of salient content and selection of seams may be accomplished by determining a saliency score for each pixel (i.e., how important the pixel is to the content of the content item). A collection of saliency scores may be determined to generate a saliency map for the content item. The saliency map may be used to determine seams for seam carving and/or for use with one or more evaluation metrics.

Evaluation metrics may be used before, during, and/or after the resizing process to determine whether to proceed with seam carving and/or use the resized image. For example, an average of the saliency scores for the saliency map may be computed. If the average of the saliency scores is below an average threshold value, then seam carving may proceed. If the average is above the average threshold value, an alternative method and/or content item may be selected (e.g., it may be preferable to not resize an image content item having a high average saliency score, but rather display the image content item with a filler to preserve the content of the image content item).

Using the saliency scores of the saliency map, seams may be selected to resize the content item by selecting seams having low saliency score pixels. In some instances, a seam cost threshold value evaluation metric may be used such that the selected seams have a saliency cost below the seam cost threshold value. The saliency cost for a seam may be calculated as the sum of the saliency costs of each pixel of that seam. In some instances, a step size may be used to limit and/or ensure a certain number of seams are selected during an iterative process for resizing the content item. Such a step size may be used with the seam cost threshold value such that the minimum or maximum of the two may be used to provide an adaptive resizing process.

In still further implementations, a total cost value evaluation metric may be calculated for the seams that are added and/or removed. Such a total cost value may be used to determine whether the resized image is to be used or not. For example, if the total cost value of removing seams from the content item exceeds a maximum value, then the resized image may have removed and/or added too many pixels with high saliency scores and potentially distorted the content of the content item. If the total cost value of removing and/or adding the seams is below a minimum value, then the resized image may have removed and/or added pixels with low saliency scores and may be unlikely to have distorted the content of the content item. Of course, other uses and implementations for the total cost value as an evaluation metric may be used as well.

I. Overview of Example System

FIG. 1 illustrates an example system 100 for providing information via a computer network such as the network 105. The network 105 can include computer networks such as the Internet, local, wide, metro or other area networks, intranets, and other computer networks such as voice or data mobile phone communication networks. The system 100 can also include a data processing system 110. The data processing system 110 can include a logic device, such as a computing device, having a processor to communicate via the network 105, for example with a resource server 120, a requesting device 125, and a third-party content provider 115. The data processing system 110 can include one or more data processing systems, such as the content placement system 130 configured to process information and provide content to the resource server 120 or the requesting device 125, and one or more databases, such as the content database 140 configured to store information. In the present example, the content placement system 130 includes a resizing module 135 that may be configured to resize one or more content items in accordance with the process 200 described in greater detail below. The data processing system 110 can include a server, such as an advertisement server.

The requesting device 125 can include computing devices such as a computer, laptop, desktop, smart phone, tablet, personal digital assistant, or server device configured to communicate with other devices via the network 105. The requesting device 125 can execute a software application (e.g., a web browser or other application) to retrieve content from other computing devices over network 105.

The resource server 120 can include a computer having a server configured to host a resource, such as a web page or other resource. For example, the resource server 120 may be a computer server (e.g., an FTP server, file sharing server, web server, etc.) or a combination of servers (e.g., a data center, a cloud computing platform, etc.). The resource server 120 can provide resource data or other content (e.g., text documents, PDF files, and other forms of electronic documents) to the requesting device 125. In one implementation, the requesting device 125 can access the resource server 120 via the network 105 to request access to a resource of the resource server 120.

In one implementation, the data processing system 110 can receive, via the network 105, a request for a content item to display with a resource. In one implementation, the resource includes a web page. The resource may include a content item slot, such as a designated location of the resource, for display of one or more third-party content items. The content placement processor 130 can be configured to receive a request from the resource server 120 or the requesting device 125. The resource server 120 may include a first party provider of a resource, who may have an agreement with the data processing system 110 for the system to provide content items to display with one or more resources of the resource server 120. The requesting device 125 may be a computing device operated by a user (represented by a device identifier), which, when accessing a resource of the resource server 120, can make a request to the data processing system 110 for content to be displayed with the resource, for instance.

In some instances, the content item slot of a resource may have a dimensional size that is different from the size of a selected content item. For example, a content item slot may be 360×50 pixels while a content item is 320×50 pixels. Accordingly, to display the content item in the content item slot, the content item may be resized and/or displayed with a filler background to result in a content item that fills the content item slot. In some instances, it may be useful to resize the content item if possible.

II. Example Process for Resizing a Content Item

Figure 2:
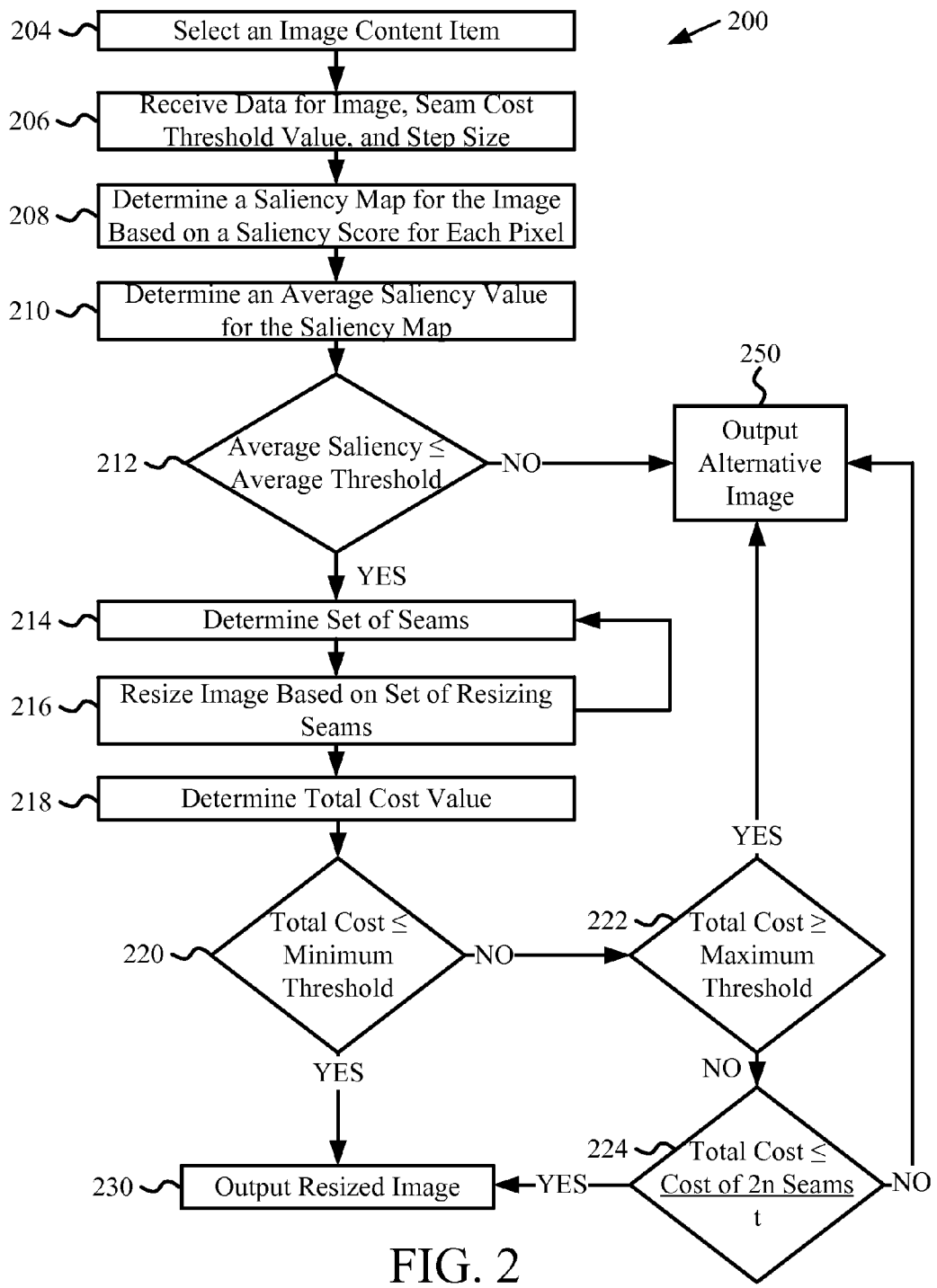
FIG. 2 is a flow diagram of an example process for resizing an image content item.

FIG. 2 depicts an example process 200 for resizing a content item, such as an image. In some implementations, a request for an image content item may be received by the content placement system 130. The request for a content item may include a request for an online advertisement, article, promotion, coupon, or product description. The content placement system 130 may receive the request from a computing device such as, e.g., requesting device 125. In some implementations, the content placement system 130 receives the request via an application executed on the requesting device 125. For example, a mobile application executed on a mobile device (e.g., smart phone or tablet) may make a request for a content item. In another example, a web page may request a content item from the content placement system 130 responsive to a user of a requesting device 125 visiting the web page.

In some implementations, the request for a content item may include information that can facilitate the selection of a content item. For example, the information may include a dimensional size of a content item slot, an IP address of the requesting device, a domain of the requesting device, data about a resource with which the content item will be displayed, historical data associated with the requesting device, the type of requesting device (e.g., a desktop, a laptop, a smartphone, a tablet, etc.), one or more characteristics of the requesting device (e.g., operating system type, performance data, display resolution, etc.), geographic location, and/or any other data.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

An image content item may be selected by the content placement system 130 (block 204). In some instances, the image content item may be selected based, at least in part, on one or more bids via a content item auction. For example, the content placement system 130 may provide one or more candidate content items to an online auction with a plurality of content items where the content item associated with the highest bid (e.g., the highest bid price made for a content item of a content provider 115) or other factors, such as the highest quality content item, is selected and provided for display on the requesting device 125. In some examples, the content placement system 130 may select or identify multiple candidate content items based on one or more factors, such as a keyword, relevance factors, quality factors, click through rate, or conversion rate.

The resizing module 135 may receive data for the image of the selected content item, a seam cost threshold value, and a step size (block 206). In some implementations, the data for the image of the selected content item may be stored in a database associated with the content placement system 130, such as the content database 140 of the data processing system 110. The data for the image may include a bitmap of the image (e.g., a matrix representing a grid of pixels). The bitmap may include positional information for each pixel along with color information, such as a hexadecimal value, RGB values, HSB/HSL values, RGBA values, HSBA/HSLA values, and/or otherwise. Various formats for the data for the image may be used, such as .BMP, .JPEG, .GIF, .PNG, .TIFF, etc.

The seam cost threshold value may be a default value, a value set by the content placement system 130, and/or a value specified by the content provider 115. In some instances, multiple seam cost threshold values may be utilized by the content placement system 130. For example, a content provider-specified value may be used, if provided, and a default seam cost threshold value may be used if no content provider-specified value is provided. In other instances, a content provider may specify seam cost threshold values that are dependent on other factors (e.g., a first seam threshold value for smartphone requesting devices, a second seam threshold value for tablet requesting devices, a third seam threshold value for laptop requesting devices, and/or a fourth seam threshold value for desktop requesting devices, etc.). Of course, other seam threshold values and/or factors may be used.

The step size may be a default value, a value set by the content placement system 130, and/or a value specified by the content provider 115. In some instances, multiple step size values may be utilized by the content placement system 130. For instances, a minimum step size and a maximum step size may be specified such that, for each seam carving iteration described below, a certain minimum or maximum number of seams are utilized. In other instances, only a minimum step size may be used or only a maximum step size may be used. In some further implementations, a content provider-specified step size or step sizes may be used, if provided, and a default step size or step sizes may be used if no content provider-specified step size or sizes are provided. In still further instances, a content provider may specify a step size or sizes that are dependent on other factors (e.g., a first step size for smartphone requesting devices, a second step size for tablet requesting devices, a third step size for laptop requesting devices, and/or a fourth step size for desktop requesting devices, etc.). Of course, other step sizes and/or factors may be used.

Figure 3A:
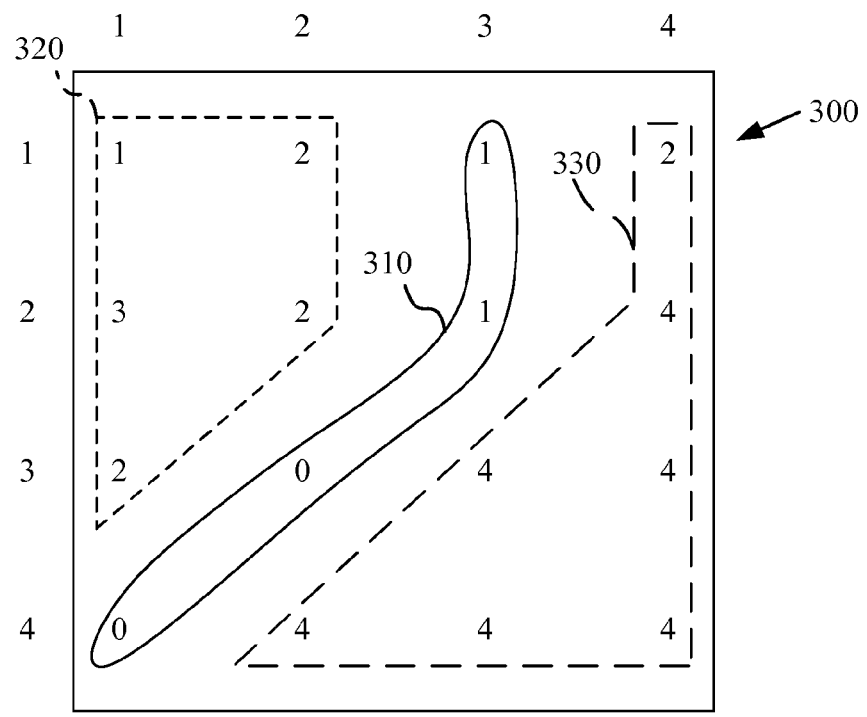
FIG. 3A is an overview of an example saliency map for an image showing an example seam.

A saliency map for the image of the content item may be determined based on the data for the image and a saliency score for each pixel of the image (block 208). An example saliency map 300 is shown in FIG. 3A and will be discussed in greater detail below. A saliency score is a score for a pixel that indicates how important the pixel is to the content of the image. For example, a pixel for the face of a person in the foreground of an image may have a higher saliency score than a pixel for a brick in a wall in the background. In some instances, it may be preferable to duplicate and/or remove pixels that have low saliency scores (i.e., are less important to the image) such that the primary content of the image is preserved.

The saliency score for each pixel may include a single value or several values to determine the score. For instance, a saliency score may be determined from a single value, from the sum of several different values, from a weighted average of several different values, and/or otherwise. The values that may be used in determining the saliency score may include a gradient saliency value, a color spatial distribution saliency value, a text detection saliency value, a face detection saliency value, a logo detection saliency value, a background region saliency value, etc.

A gradient saliency value may be a value for a pixel that is determined based on the intensity variation between pixels in the vertical and horizontal directions. Put another way, the gradient saliency measure how gradually or rapidly the color of pixels changes. For example, the pixels of an edge of a red flag on a blue sky background may have high gradient saliency values while pixels within the red flag may have low gradient saliency values.

A color spatial distribution saliency value may be a value for a pixel that is determined based on the dominant color clusters in an image relative to the spatial variation of the pixels of that color. For example, an object near the foreground of an image, such as a red ball, will likely have a large number of red pixels clustered together while a black and white checked background may have less pixels of the same color and the pixels may be spread out. The pixels that are red and closely spaced together will likely have a high color spatial distribution saliency value relative to the pixels for the checked background.

A text detection saliency value may be determined using optical character recognition (OCR) to determine regions of text within the image. Accordingly, the pixels corresponding to the identified regions of text may have a high text detection saliency value while other regions of the image may have a low or zero text detection saliency value. In some implementations, a bounding box may be used to identify a word instead of individual characters, thereby potentially preserving the character spacing.

A face detection saliency value may be determined using face recognition detectors to determine regions of faces within the image. Accordingly, the pixels corresponding to the identified face regions may have a high face detection saliency value while other regions of the image may have a low or zero face detection saliency value. In some instances, a buffer region around the identified face region may be specified such that pixels surrounding the face may have a higher face detection saliency value.

A logo detection saliency value may be determined using a logo detector to compare regions of the image to a database of logos. Accordingly, when a logo is detected, the region of pixels corresponding to the logo may have a high logo detection saliency value while other regions of the image may have a low or zero logo detection saliency value. In some instances, a buffer region around the identified logo region may be specified such that pixels surrounding the logo may have a higher logo detection saliency value.

A background region saliency value may be determined by detecting dominant colors over large portions of the image that may be indicative of a background region. For example, content items may include a single color or simple color scheme for the background of the content item. Identification of this background region of the content item may be useful for image manipulation via seam carving. For example, if the data for a content item indicates that more than 50% of the pixels are white in color, this may be indicative of these pixels being part of a background region. In some instances, the detection of the background region may include determining that the dominant color pixels are contiguous or form large clusters (e.g., plain text on a white background would have substantially contiguous white pixels for the background). In some implementations, the background region saliency values may be inversely correlated with the determination that the pixels are part of a background region (i.e., lower values for pixels of identified background regions and higher values for pixels that are not part of the identified background regions). Of course other methods to detect background regions may be used as well.

As noted above, based on the one or more saliency values, a saliency score for each pixel of the plurality of pixels may be determined. In some instances, weighting values may be assigned to each saliency value and an average score may be determined and used as the saliency score for each pixel. These saliency scores may be used to generate a saliency map, such as a matrix of saliency scores, corresponding to the pixels of the image. FIG. 3A depicts an example saliency map 300 for an example image having four rows and four columns of pixels with a saliency score for each pixel indicated.

In some implementations, an initial evaluation metric may be used to determine whether to initially proceed with resizing the image using seam carving. For example, an average saliency value may be determined for the saliency map (block 210). The average saliency value may be an average of all the saliency scores of the saliency map. Using the saliency map of FIG. 3A as an example, the average saliency value may be the sum of each saliency score, a total of 38 in this example, divided by the number of saliency scores, 16, to result in an average saliency value, such as 2.375. Of course, the foregoing numbers are merely examples. In some instances, the saliency scores may have a range of 0, inclusive, to 255, inclusive, or any other range for saliency scores (e.g., 0, inclusive, to 3 inclusive; 0, inclusive, to 7, inclusive; 0, inclusive, to 15, inclusive; 0, inclusive, to 31, inclusive; 0, inclusive, to 63, inclusive; 0, inclusive, to 127, inclusive; 0, inclusive, to 511, inclusive; 0, inclusive, to 1023, inclusive; 0, inclusive, to 2047, inclusive; 0, inclusive, to 4095, inclusive; 0, inclusive, to 8191, inclusive; 0, inclusive, to 16383, inclusive; 0, inclusive, to 32767, inclusive; 0, inclusive, to 65535, inclusive, etc.).

The determined average saliency value may be compared to an average threshold value (block 212). For example, for a range of saliency scores of 0, inclusive, to 255, inclusive, the average threshold value may be 220. If the average saliency value is equal to and/or exceeds the average threshold value, it may indicate that the image may not be suitable for resizing using seam carving (i.e., too many of the pixels are indicated as being important to the content of the image). In such instances, an alternative image content item may be outputted (block 250). For example, if a content item has many important or salient pixels such that the determined average saliency value exceeds the average threshold value, then a filler background may be added such that the image of the content item remains substantially the same and the filler background fills in the gaps surrounding the image to fill the content item slot. In other instances, the content item may be resized using an alternative method, such as by scaling, and/or another content item may be selected. An example of such an image of an image content item for which seam carving may not be suitable and for which a filler background is provided is shown and described in reference to FIGS. 4A-4C.

If the determined average saliency value is below the average threshold value and/or no average saliency value is determined (i.e., the average saliency threshold determination is not used), then a determination of a set of seams for seam carving may be made (block 214). The set of seams may be selected based on the seams with the lowest saliency cost path through the image in the desired dimension. For a vertical seam, the seam may be determined based on the saliency scores of the saliency map that form a path along the y-axis (e.g., top to bottom) that has the lowest cumulative pixel saliency score. It should be understood that each seam in the determined set of seams does not overlap with another seam in the determined set of seams (e.g., each pixel can be part of only one seam for that determined set of seams). FIG. 3A depicts an example low saliency cost seam 310 between pixel regions 320, 330 having higher saliency scores. In the present example, the saliency cost of the seam 310 is 2, though, as noted above, other numerical values and ranges may be used. For a horizontal seam, the seam may be determined based on the saliency scores of the saliency map that form a path along the x-axis (e.g., left to right) that has the lowest cumulative pixel saliency scores.

In some implementations, a determination of a total number of pixels to be added and/or removed from the image may be made by comparing a dimensional size of the image to a received dimensional size of a content item slot in which the content item will be shown. For example, a content item slot may be 360 pixels wide by 50 pixels high while a selected content item is 320 pixels wide by 50 pixels high. Accordingly, it may be determined that 40 pixels may need to be added to the selected content item. If each seam is a single pixel wide, then the total number of seams needed to expand the image via seam carving may be 40 seams. In some implementations, seams may be more than one pixel wide (e.g., 2, 3, 4, 5, etc. pixels), thus the total number of seams may be the total number of pixels divided by the pixel width of the seams. In some instances, the pixel width of the seam may be predetermined (i.e., preset to one pixel wide, two pixels wide, etc.).

In some instances, a seam cost threshold value may be used to limit the number of seams in the determined set of seams such that each seam has a saliency cost below the seam cost threshold value. In the example shown in FIG. 3A, if the seam cost threshold value is 2, then only seam 310 may meet this threshold. If the seam cost threshold value is 1, then no seams may meet this threshold. If the seam cost threshold value is 3, then several seams may be identified that have a saliency cost equal to and/or below the threshold. As will be described in greater detail below, the seam cost threshold value may be used to provide adaptive seam carving.

Figure 3B:
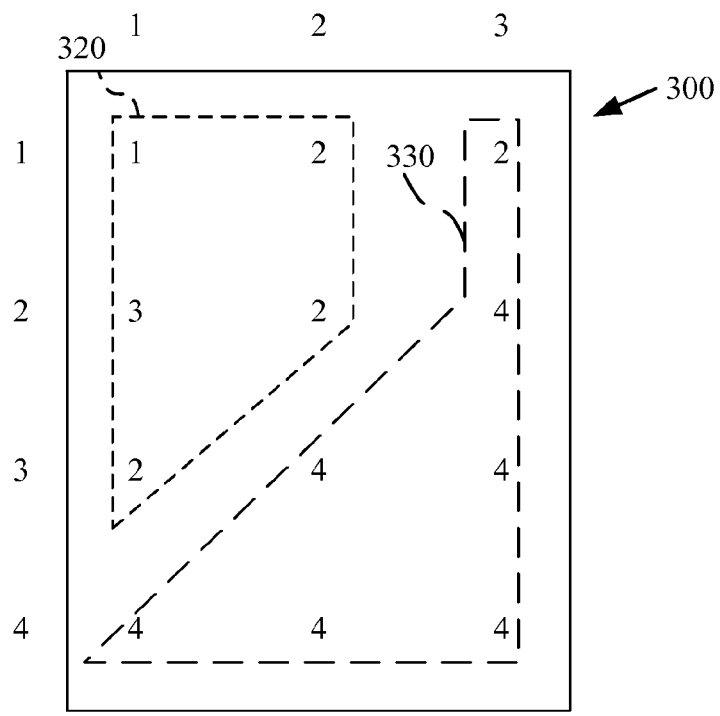
FIG. 3B is an overview of the example saliency map of FIG. 3A with the example seam removed.

The image may be resized by inserting and/or deleting pixels using a set of resizing seams (block 216). FIG. 3B depicts the saliency map 300 of FIG. 3A having the example seam 310 removed such that pixel regions 320, 330 abut to shrink the image. In some versions, the saliency map 300 may be used to generate the resized image. For example, the values of the saliency map may be mapped to the pixels of the image such that the corresponding pixels may be added or deleted from the image. In another example, the saliency map may include color information along with the saliency score (e.g., (saliency_score, color_information)) such that manipulation of the saliency map directly adds or deletes the relevant pixel color information. The color information and positional information (e.g., row and column) from the saliency map may then be used to generate the resized image.

In some instances, the set of resizing seams may correspond to the determined set of seams. For instance, if an image needs 5 pixels to be added or removed and 5 one-pixel seams are identified as having a saliency cost below the seam cost threshold value, then the set of resizing seams may be the same as the determined set of seams. In other instances, the set of resizing seams may be a subset of the determined set of seams, such as when the determined set of seams exceeds a maximum step size, or the set of resizing seams may be a predetermined minimum number of lowest saliency cost seams, such as when the determined set of seams is below a minimum step size.

In the instance where there are no seams in the determined set of seams or the seams in the determined set of seams is below the minimum step size, then the lowest saliency cost seams equal to the value of the minimum step size may be selected as the set of resizing seams. For example, if 2 seams are identified as having saliency costs below the seam cost threshold value and the minimum step size is 5, then the 5 lowest saliency cost seams, including the 2 seams of the determined set of seams, may be used as the set of resizing seams. If the total number of seams needed to resize the image has not been met, then the process 200 may iterate through a number of sets of resizing seams until the image has been resized to the desired dimensional size (blocks 214, 216).

In the instance where a maximum step size is utilized, the process 200 may iterate through a number of sets of resizing seams until the image has been resized to a desired dimensional size. For example, if an image needs 40 seams to be added and the maximum step size is 10 seams, then the 10 lowest saliency cost seams from a determined set of 100 seams may be used during a first iteration in resizing the image to generate a second image. In some implementations, the second image may not be generated, but may be represented by a modified saliency map having the added or removed seams. The process 200 may then perform a second iteration to determine a second set of seams (block 214) for the second image having a saliency cost below the seam cost threshold value. The 10 lowest saliency cost seams from the second determined set of seams may then be used in resizing the second image (block 216). The iterations may repeat until the image has been resized to the desired dimensional size. In some instances, the seams in the second iteration may overlap with the seams from the first iteration (though seams do not overlap within each iteration). In the instance of adding seams, the lowest saliency cost seams may be used more frequently when resizing the image through the iterative process.

Some implementations may use only a maximum step size. If the number of seams in the determined set of seams is below the maximum step size, then the number of seams for the set of resizing seams may be selected from the minimum of the number of seams below the seam cost threshold value and the maximum step size. By way of example, if 15 seams are determined to be below the seam cost threshold value and the maximum step size is 10, then the 10 lowest cost seams of the determined set of seams will be selected since the step size of 10 is the minimum. If 5 seams are determined to be below the seam cost threshold value and the maximum step size is 10, then the 5 seams of the determined set of seams will be selected as the minimum between the two. The 5 seams will then be used to resize the image to a resized or second image. If, for example, 15 seams need to be added to resize the image, then the process 200 may determine a second set of seams (block 214) from the second image that have a saliency cost below the seam cost threshold value. In the current example, the 5 initial seams and the 5 duplicate seams, for a total of 10 seams, may be determined as the second set of seams below the seam cost threshold value. Thus, with a maximum step size of 10 and a determined set of seams of 10 seams, the minimum would be 10 for both. Thus, the first iteration used 5 seams and the second iteration used 10 seams. Accordingly, the number of seams used during each iteration may be adaptive and may vary based on the seam cost threshold value and the maximum step size. An example of such an adaptive seam carving process is shown and described in reference to FIGS. 5F-5H.

After the image has been resized, in some versions a total cost value may be determined (block 218) and used as an evaluation metric after the image of the selected content item has been resized. The total cost value may be the sum of the saliency costs of the seams added and/or removed from the image during resizing. If the determined total cost value is below a minimum cost threshold value (block 220), then the resized image may be used for a resized image content item that may be outputted (block 230) to be served with the resource. That is, if the seams added or removed from the resized image had low saliency scores for the pixels, it is likely that the added or removed seams may not have significantly affected the salient content of the image, so the resized image content item may be used.

If the determined total cost value is not below a minimum cost threshold value, then a comparison between the total cost value and a maximum threshold value may be made (block 222). If the total cost value is above the maximum threshold value, then an alternative image content item may be outputted (block 250), examples of which are shown in FIGS. 4B-4C, another content item may be selected, and/or other resizing for the selected content item may be used. In other words, if the seams added or removed from the resized image had high saliency scores for the pixels or if too many seams of an average saliency cost were added or removed, it is possible that the added or removed seams may have affected the salient content of the image, so an alternative image content item or a different image content item may be preferred.

If the determined total cost value is not below a minimum cost threshold value and not above the maximum threshold value, then a comparison between the total cost for the seams added or removed and the total cost for the seams added or removed and the next set of seams divided by a tolerance parameter is made (block 224). That is, for n number of seams having a total cost, $C_n$, a comparison is made to the total cost, $C_{2n}$, for 2n number of seams (i.e., the set of n number of seams plus the next n number of seams). If the total cost, $C_n$, is equal to or less than the total cost, $C_{2n}$, for the 2n seams over the tolerance parameter, t, i.e., $$C_n \le \frac{C_{2n}}{t},$$

then the resized image content item may be outputted (block 230). The tolerance parameter, t, can be set to any positive number greater than or equal to 2. If the tolerance parameter is set to a large value, such as 5 or 10 for example, then fewer resized images may be outputted, but the resized images that are outputted may have a better seam carving result. If the tolerance parameter is set closer to 2, then more resized images may be outputted. In some implementations, the tolerance parameter may be varied to fine tune the outputted resized images.

By way of example, if 5 seams are used, each with a saliency cost of 1, 1, 2, 3, 4, and the next set of 5 seams each have a saliency cost of 4, 4, 4, 5, 5, then the total cost for the n seams, $C_n$, is 11 and the total cost for the 2n seams, $C_{2n}$, is 33. If a tolerance parameter of 3 is selected for t, then the total cost for the n seams, $C_n$=11, is equal to the total cost for the 2n seams over the tolerance parameter t, $C_{2n}/3$=11. Thus, it indicates that, among the 2n seams, the first n seams have a lower saliency cost, so the resized image content item may be useful. If the total cost for the n seams is greater than the total cost for the 2n seams divided by the tolerance parameter, then it may be indicative of the n seams not being as useful for resizing the image content item and an alternative image content item may be outputted (block 250), examples of which are shown in FIGS. 4B-4C.

In some instances, the addition and/or removal of seams may result in a gap. Such a gap may be filled using hole filling or inpainting. In one implementation, pixels may be selected to fill gaps in the resized image by selecting a color that is the average of the surrounding pixels. In other implementations, the gaps may be filled by using pixels from the most similar region nearby.

In some implementations, process 200 may be performed independent of receiving a request for a content item. For example, process 200 may be performed offline for an image content item. One or more sizes may be selected and the image content item may be resized for those sizes using process 200 when the image content item is received from a content provider 115 and/or at any other time. In one implementation, an image content item may be received from a content provider 115 by the data processing system 110 and the resizing module 135 may have a set of sizes for which the image content item is to be resized. The image content item may be resized using process 200 for the set of sizes and the output resized image content items (block 230) may be stored in a database, such as content database 140. Accordingly, when the image content item is selected for a content item slot that is one of the sizes of the set of sizes, the resized image content item may be selected from the content database 140 to be served for the content item slot. Thus, the content placement system 130 may not need to perform the resizing when the request for a content item is received, thereby allowing the processing to be performed at other times.

Figure 4A:
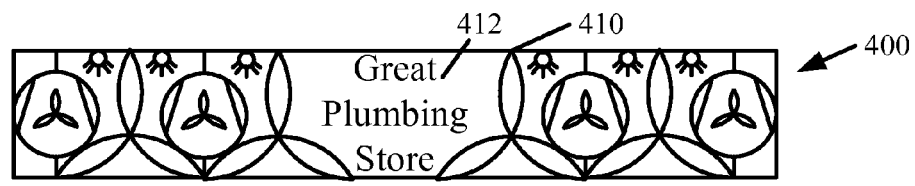
FIG. 4A is an example image content item for which an average saliency value may exceed the average threshold value.
Figure 4B:
FIG. 4B is an example showing the image of the image content item of FIG. 4A having filler added.
Figure 4C:
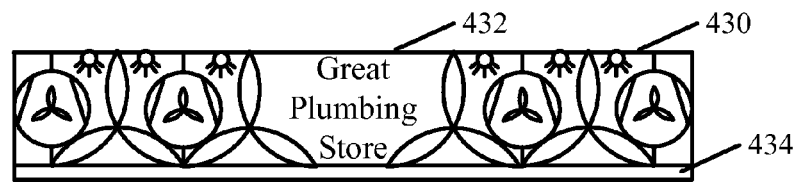
FIG. 4C is another example showing the image of the image content item of FIG. 4A having filler added.

FIGS. 4A-4C depict an example image content item 400 having an image 410 that may have a determined average saliency value that exceeds the average threshold value and for which an alternative image content item of FIGS. 4B-4C may be used instead of resizing the image 410 using seam carving of process 200. Referring back to the process 200 of FIG. 2, the image content item 400 may be selected (block 204), such as via a content item auction and/or otherwise. The data for the image 410 of the image content item 400 may be received along with a seam cost threshold value and a step size (block 206). A saliency map for the image 410 may be determined based on the saliency scores for each pixel of the image 410 (block 208). In the present example, each pixel may be assigned a saliency score based on a weighted average of a gradient saliency value, a color spatial distribution saliency value, a text detection saliency value, a face detection saliency value, a logo detection saliency value, and a background region saliency value. For example, the image 410 includes a text region 412 corresponding to the words "Great Plumbing Store." Accordingly, the pixels for the detected text region 412 may have a high text detection saliency value. In addition, the other regions of the image 410 may have high gradient saliency values based on the number of lines and edges. As a result of such high saliency values, the saliency scores for each pixel of the image 410 may be high. Using the saliency values, saliency scores for each pixel may be determined and used to form a saliency map, similar to that shown in FIG. 3A.

Using the saliency scores for each pixel of the image 410, an average saliency value for the saliency map for the image 410 may be determined (block 210). For instance, in the present example, the average saliency score for the determined saliency map of the image 410 may be a value of 235 on a scale of 0, inclusive, to 255, inclusive. If an average threshold value of 220 is used, then the comparison of the determined average saliency score to the average threshold value (block 212) will indicate that the determined average saliency score exceeds the average threshold value. Accordingly, an alternative image content item may be outputted (block 250). Examples of such alternative content items are shown in FIGS. 4B-4C.

If, for example, the content item slot for which the content item is to be display in has a dimensional width that is larger than the width of the content item, then a filler background 422 may be added to the image 410 to fill in the gaps surrounding the image 410. An example of such an alternative image 420 is shown in FIG. 4B. Similarly, if the content item slot for which the content item is to be display in has a dimensional height that is larger than the height of the content item, then a filler background may be added above and/or below the image 410 to fill in the gaps surrounding the image 410.

If, for example, the content item slot for which the content item is to be display in has a dimensional width that is smaller than the width of the content item, then the image 410 may be scaled down in size to a resized image 432 to fit the smaller dimensional width and a filler background 434 may be added to fill in the gaps surrounding the resized image 432. An example of such an alternative image 430 is shown in FIG. 4C. Similarly, if the content item slot for which the content item is to be display in has a dimensional height that is smaller than the height of the content item, then the image 410 may be scaled down in size to a resized image to fit the smaller dimensional height and a filler background may be added to fill in the gaps surrounding the resized image.

Figure 5A:
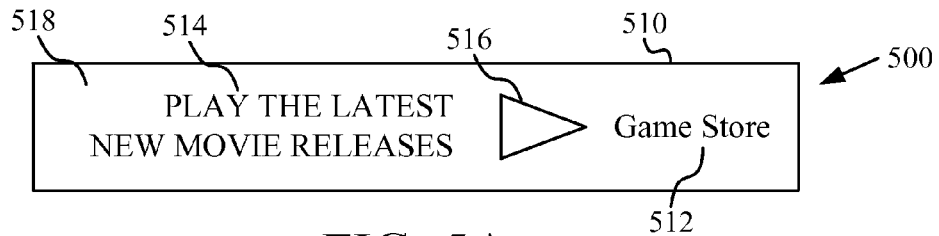
FIG. 5A is an example image content item for which adaptive seam carving may be applied.
Figure 5B:
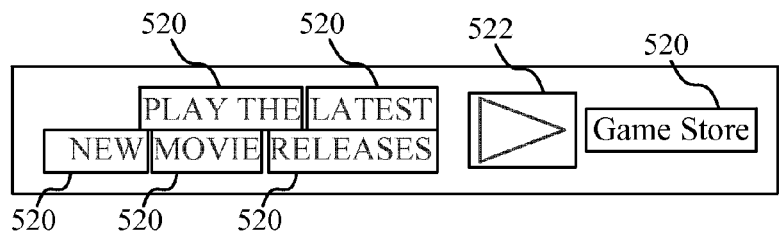
FIG. 5B is an example showing a detected text region and a logo region for the image of the image content item of FIG. 5A.
Figure 5C:
FIG. 5C is an example showing several seams for the image of the image content item of FIG. 5A that may be below a seam cost threshold value.
Figure 5D:
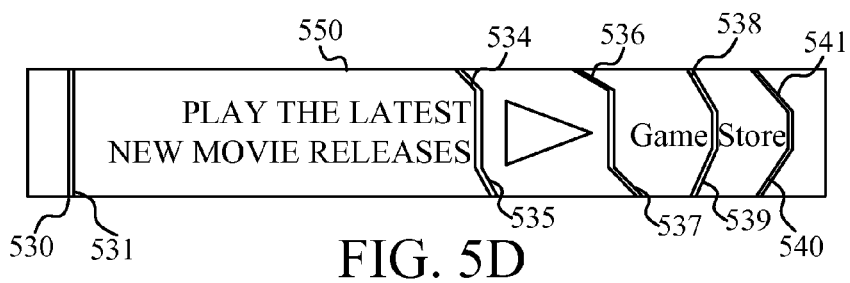
FIG. 5D is an example showing a second resized image for the image content item of FIG. 5A after resizing by duplicating seams.
Figure 5E:
FIG. 5E is an example resized image for the image content item of FIG. 5A.
Figure 5F:
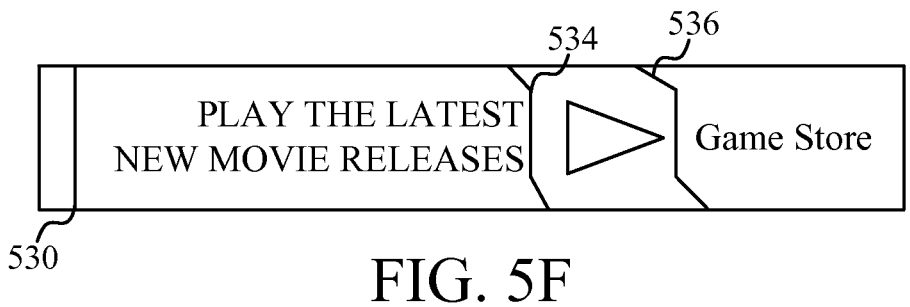
FIG. 5F is an example showing several seams for the image of the image content item of FIG. 5A that may be below a seam cost threshold value.
Figure 5G:
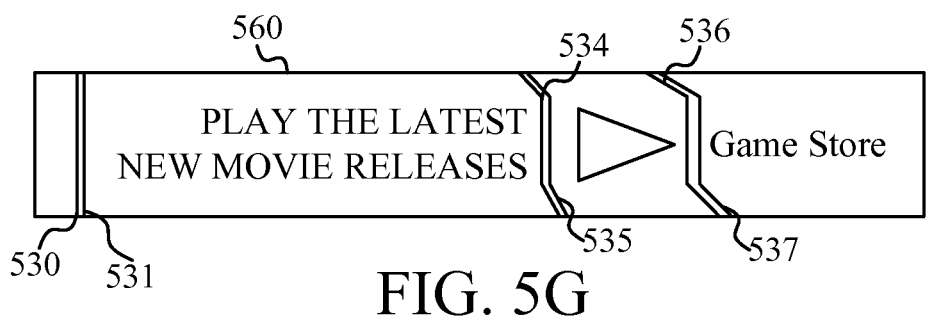
FIG. 5G is an example showing a second resized image for the image content item of FIG. 5A after resizing by duplicating seams of FIG. 5F.
Figure 5H:
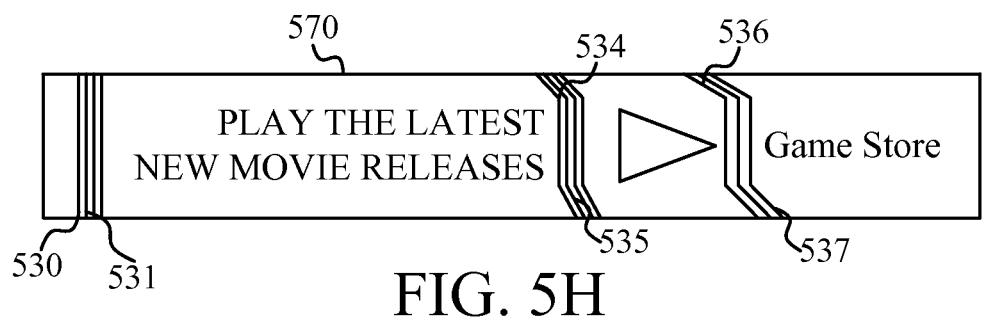
FIG. 5H is an example showing a third resized image for the image content item of FIG. 5A after resizing by duplicating additional seams of FIG. 5G.

FIGS. 5A-5H depict an example of an image content item 500 having an image 510 for which adaptive seam carving has been applied. FIG. 5A depicts an example image content item 500 having an image 510 that includes text 512, 514, a logo 516, and a background 518. Referring back to the process 200 of FIG. 2, the image content item 500 may be selected (block 204), such as via a content item auction and/or otherwise. The data for the image 510 of the image content item 500 may be received along with a seam cost threshold value and a step size (block 206). In the present example, the seam cost threshold value may be 50 and the maximum step size may be 5 seams. The seam cost threshold value and/or the step size may be default values, content provider-selected values, content placement system 130 selected values, and/or may be determined through any other manner.

A saliency map for the image 510 may be determined based on the saliency scores for each pixel of the image 510 (block 208). In the present example, each pixel may be assigned a saliency score based on a weighted average of a gradient saliency value, a color spatial distribution saliency value, a text detection saliency value, a face detection saliency value, a logo detection saliency value, and a background region saliency value. For example, referring to FIG. 5B, the image 510 includes detected text regions 520 corresponding to the text "PLAY THE," "LATEST," "NEW," "MOVIE," "RELEASES," and 'Game Store." Accordingly, the pixels corresponding to the detected text regions 520 may have a high text detection saliency value for those pixels.

The image 510 also includes a detected logo region 522 corresponding to the detected triangular logo 516. In some implementations, the logo 516 may be detected by comparing the pixels of the image to a database of logos. The pixels corresponding to the detected logo region 522 may have a high logo detection saliency value for those pixels. Each pixel may also have other saliency values determined, such as a gradient saliency value, a color spatial distribution saliency value, a face detection saliency value, and/or a background region saliency value. A saliency score for each pixel may be determined based on a weighted average of the saliency values. The saliency scores may then be used to create a saliency map for the image 510, such as a matrix of values from 0, inclusive, to 255, inclusive, with a row and column corresponding to the pixel of the image for which the saliency score applies. Such a saliency map may be similar to the example provided in FIG. 3A.

Using the saliency scores for each pixel of the image 510, an average saliency value for the saliency map for the image 510 may be determined (block 210). For instance, in the present example, the average saliency score for the determined saliency map of the image 510 may be a value of 100 on a scale of 0, inclusive, to 255, inclusive. If an average threshold value of 220 is used, then the comparison of the determined average saliency score to the average threshold value (block 212) will indicate that the determined average saliency score is below the average threshold value. Accordingly, resizing the image using seam carving may be useful and can proceed instead of using an alternative image content item, such as those shown in FIGS. 4B-4C.

A determination may be made for a set of seams for seam carving (block 214). The set of seams may be selected based on the seams with the lowest saliency cost path through the image 510 in the desired dimension. In the present example, a seam cost threshold value of 50 is used to limit the number of seams in the determined set of seams such that each seam has a saliency cost below the seam cost threshold value of 50. For example, as shown in FIG. 5C, 6 seams 530, 532, 534, 536, 538, 540, have been identified as having a seam cost below the seam cost threshold value. For example, the cost for the seams 530, 532, 534, 536, 538, 540, may be 0, 44, 10, 15, 30, and 20, respectively. Since the maximum step size of the present example is 5, then only the 5 lowest saliency cost seams will be used in the initial iteration of seam carving. Accordingly, only seams 530, 534, 536, 538, and 540 will be used.

FIG. 5D depicts an example second image 550 for the image content item 500 showing the seams 530, 534, 536, 538, and 540 and the duplicated seams 531, 535, 537, 539, and 541 after resizing the image for a first iteration (block 216). If only 5 seams needed to be added to resize the image 510 of the image content item 500, then the process 200 may continue to determine the total cost value of the seams added and/or removed (block 218). If, for example, 10 seams are needed to resize the image, then a determination may be made for a second set of seams for seam carving for a second iteration (block 214). For example, using the seam costs from above and the newly added duplicate seams, the seams below the seam cost threshold are seams 530, 531, 532, 534, 535, 536, 537, 538, 539, 540, and 541 with corresponding seam costs of 0, 0, 44, 10, 10, 15, 15, 30, 30, 20, and 20, respectively. Thus, 11 seams have a seam cost below the seam cost threshold value. Since the step size is limited to 5 seams, for the second iteration the 5 seams with the lowest seam cost would be 530, 531, 534, 535, and 536 (or 537) with costs of 0, 0, 10, 10, and 15, respectively. These 5 seams may be duplicated to further increase the size of the image (block 216). Such an iterative process may continue until the image has been resized to the desired dimensional size. An example of a resized image 560 after several iterations is shown in FIG. 5E.

In some instances, the number of seams that are below the seam cost threshold value may be less than the maximum step size. For example, as shown in FIG. 5F, if the seam cost threshold value is 18, then only seams 530, 534, and 536 having seam costs of 0, 10, and 15, respectively, are determined to be in the set of seams (block 214) that are below the seam cost threshold. Accordingly, the minimum between the number of seams of the determined set of seams, in this example 3, and the step size, in this example 5, may be the number of seams to be used in the set of resizing seams. Thus, for the initial iteration of seam carving, only the 3 seams, 530, 534, and 536, will be used since the 3 seams in the determined set of seams is the minimum between the determined set of seams and the step size.

FIG. 5G depicts an example second image 560 for the image content item 500 showing the seams 530, 534, and 536 and the duplicated seams 531, 535, and 537 after resizing the image for a first iteration (block 216). If only 3 seams needed to be added to resize the image 510 of the image content item 500, then the process 200 may continue to determine the total cost value of the seams added and/or removed (block 218). If, for example, 10 seams are needed to resize the image, then a determination may be made for a second set of seams for seam carving for a second iteration (block 214). For example, using the seam costs from above with the newly added duplicate seams, the seams below the seam cost threshold are seams 530, 531, 534, 535, 536, and 537 with corresponding seam costs of 0, 0, 10, 10, 15, and 15, respectively. Thus, 6 seams have a seam cost below the seam cost threshold value. Since the step size is limited to 5 seams, for the second iteration the 5 seams with the lowest seam cost would be 530, 531, 534, 535, and 536 (or 537) with costs of 0, 0, 10, 10, and 15, respectively. Thus, the number of seams used in the second iteration has increased to 5 seams from the 3 seams used in the first iteration based on the seam cost threshold value and the step size. The 5 seams may be duplicated to further increase the size of the image (block 216), such as the third image 570 shown in FIG. 5H. For the present example needing 10 seams to be added, a third iteration is needed since only 8 seams (3+5) have been added. Accordingly, the 2 lowest cost seams may be used to achieve the final 2 seams to expand the image. If, for example, more seams are needed, then the process may continue until the image has been resized to the desired dimensional size.

Figure 6A:
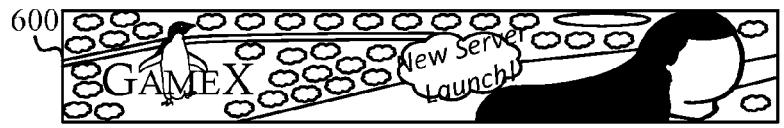
FIG. 6A is another example image content item for which adaptive seam carving may be applied.
Figure 6B:
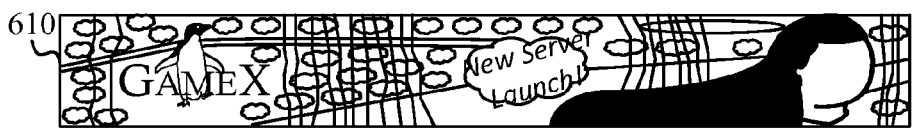
FIG. 6B is an example resized image for the image content item of FIG. 6A showing several determined seams used in resizing the image.
Figure 6C:
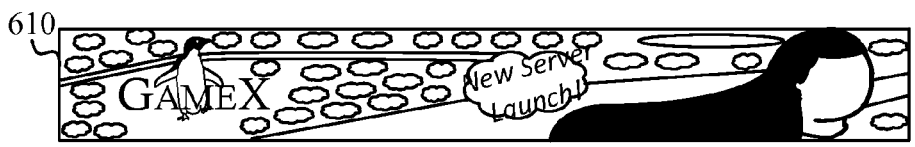
FIG. 6C is an example resized image for the image content item of FIG. 6A with the determined seams omitted.

FIGS. 6A-6C, 7A-7C, and 8A-8C depict additional examples of images for image content items that may be resized using process 200. For example, FIG. 6A depicts an image 600 of another example image content item. In this example, the image includes a face that may be detected such that the pixels for the face may have a high face detection saliency value. In addition, the text for "New Server Launch!" and "GameX" may be detected such that the pixels for the text may have a high text detection saliency value. Accordingly, when seams are determined for the image 600, such as those shown in FIG. 6B for the resized image 610, the pixels for the face and the text may be less likely to be selected for seams during the resizing. FIG. 6C depicts the resized image 610 without the seams.

Figure 7A:
FIG. 7A is yet another example image content item for which adaptive seam carving may be applied.
Figure 7B:
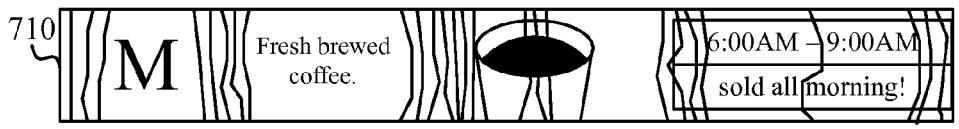
FIG. 7B is an example resized image for the image content item of FIG. 7A showing several determined seams used in resizing the image.
Figure 7C:
FIG. 7C is an example resized image for the image content item of FIG. 7A with the determined seams omitted.

FIG. 7A depicts another image 700 of another example image content item. In this example, the image 700 includes a logo, an "M," that may be detected such that the pixels for the logo may have a high logo detection saliency value. In addition, the text for "Fresh brewed coffee," "6:00 AM-9:00 AM," and "sold all morning!" may be detected may also be detected such that the pixels for the text may have a high text detection saliency value. Accordingly, when seams are determined for the image 700, such as those shown in FIG. 7B for the resized image 710, the pixels for the logo and the text may be less likely to be selected for seams during the resizing. FIG. 7C depicts the resized image 710 without the seams.

Figure 8A:
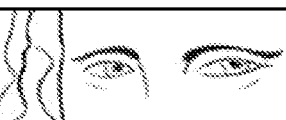
FIG. 8A is still another example image content item for which adaptive seam carving may be applied.
Figure 8B:
FIG. 8B is an example resized image for the image content item of FIG. 8A showing several determined seams used in resizing the image.
Figure 8C:
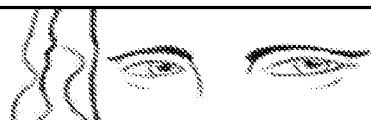
FIG. 8C is an example resized image for the image content item of FIG. 8A with the determined seams omitted.

FIG. 8A depicts another image 800 of another example image content item. In this example, the image 800 includes a face that may be detected such that the pixels for the face may have a high logo detection saliency value. In addition, the text "Discover the earlier version of the Mona Lisa by da Vinci" for the image may also be detected such that the pixels for the text may have a high text detection saliency value. Accordingly, when seams are determined for the image 800, such as those shown in FIG. 8B for the resized image 810, the pixels for the face and the text may be less likely to be selected for seams during the resizing. FIG. 8C depicts the resized image 810 without the seams.

While some example implementations for increasing the dimensional width of an image for an image content item have been shown and described, it should be understood that process 200 may be used to increase the dimensional height of an image of an image content item, reduce the dimensional width of an image of an image content item, and/or reduce the dimensional height of an image of an image content item. Furthermore, it should be understood that image content items are used as an example and that the process 200 may be used with other images and/or other media as well.

Figure 9:
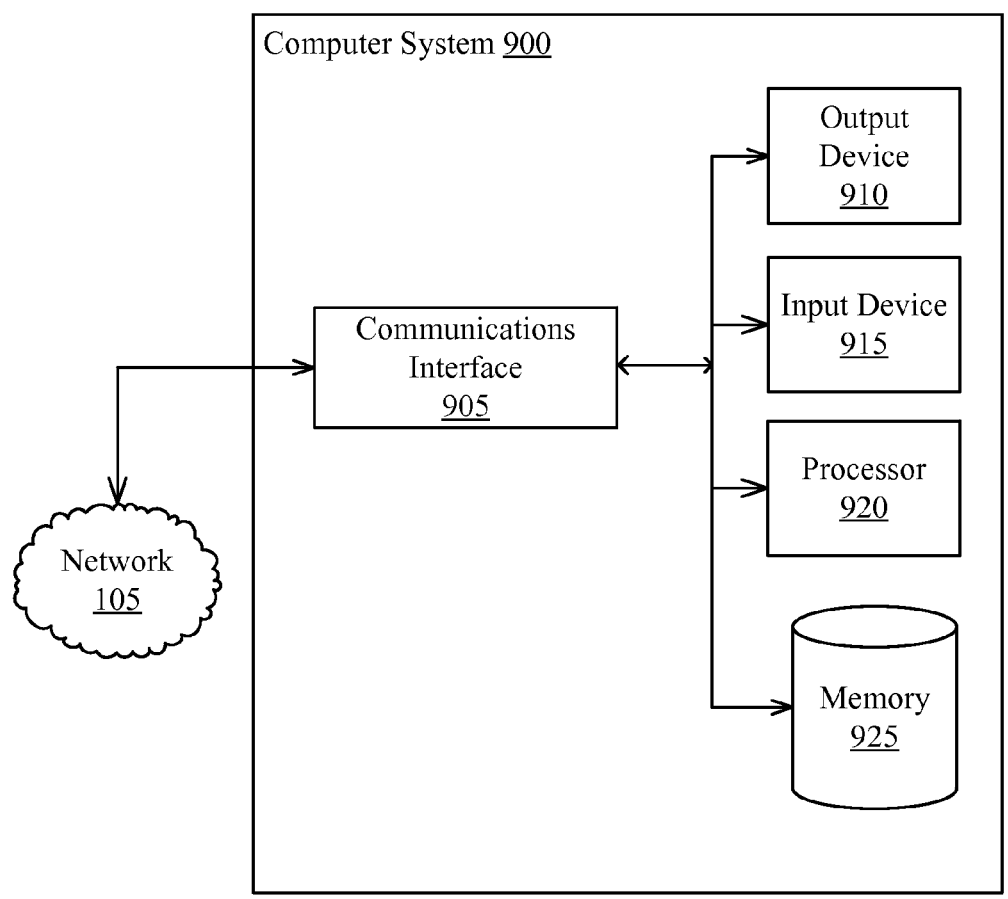
FIG. 9 is a block diagram illustrating a general architecture for a computer system that may be employed to implement various elements of the systems and methods described and illustrated herein.

FIG. 9 shows the general architecture of an illustrative computer system 900 that may be employed to implement any of the methods or systems discussed herein in accordance with some implementations. In some instances, multiple computer systems 900 may be used for one or more aspects of system 100 described herein. The computer system 900 may be used to provide information via network 105. The computer system 900 comprises one or more processors 920 communicatively coupled to memory 925, one or more communications interfaces 905, one or more output devices 910 (e.g., one or more display units), and one or more input devices 915. The processors 920 may be included as part of the data processing system 110, the content placement system 130, the resizing module 135, the resource server 120, the requesting device 125, and/or the content provider 115.

In the computer system 900, the memory 925 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). The processor(s) 920 may be used to execute instructions stored in the memory 925 and, in so doing, also may read from or write to the memory various information processed and or generated pursuant to execution of the instructions.

The processor 920 of the computer system 900 also may be communicatively coupled to or control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to and/or receive information from other devices (e.g., other computer systems).

The output devices 910 of the computer system 900 may be provided, for example, to allow various information to be viewed or otherwise perceived in connection with execution of the instructions. The input device(s) 915 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The term "data processing apparatus," "data processing system," or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including several of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for resizing an image comprising:
   receiving, at one or more data processors, a request for a content item to be displayed with a resource;
   selecting, using the one or more data processors, a content item comprising an image having a plurality of pixels;
   identifying, by the one or more data processors, a seam cost threshold value, and a step size;
   determining, by the one or more data processors, a saliency score for each pixel of the plurality of pixels of the image, the saliency score for each pixel is based on at least one of:
   a logo detection saliency value,
   a text detection saliency value, or
   a face detection saliency value;
   determining an average saliency value for the image based on the determined saliency scores;
   determining a set of seams for the image based on the determined saliency scores if the average saliency value is below an average threshold value, wherein each seam of the set of seams has a saliency cost below the seam cost threshold value;
   resizing, by the one or more data processors, the image based on a set of resizing seams, wherein the set of resizing seams comprises a number of seams equal to the minimum of a number of seams of the determined set of seams and the step size; and
   outputting display data to effect display of the resized image.

2. The method of claim 1, wherein the determined saliency score for each pixel is based on the logo detection saliency value, wherein the determining the saliency score for each pixel comprises comparing regions of the image to a database of logos.

3. The method of claim 1, wherein the determining the saliency score for each pixel further comprises determining a buffer for one or more logos of the image.

4. The method of claim 1, wherein the determined saliency score for each pixel is based on the text detection saliency value, wherein the determining the saliency score for each pixel comprises determining one or more regions of text within the image using optical character recognition.

5. The method of claim 4, wherein the determining the saliency score for each pixel further comprises determining a bounding box for a word based on the determined one or more regions of text.

6. The method of claim 1 further comprising:
   outputting an alternative image if the average saliency value is equal to or above the average threshold value.

7. The method of claim 1, wherein the saliency score for each pixel is further based on a background region saliency value.

8. The method of claim 7, wherein the determining the saliency score for each pixel further comprises determining one or more dominant colors over a portion of the image indicative of a background region.

9. The method of claim 1, wherein the image comprises a third-party content item.

10. A computer readable storage device storing instructions that, when executed by one or more data processors, cause the one or more data processors to perform operations comprising:
    receiving data for an image having a plurality of pixels, a seam cost threshold value, and a step size;
    determining a saliency score for each of the plurality of pixels of the image, the saliency score for each pixel is based on at least one of:
    a logo detection saliency value,
    a text detection saliency value, or
    a face detection saliency value;
    determining an average saliency value for the image based on the determined saliency scores;
    determining a set of seams for the image based on the determined saliency scores if the average saliency value is below an average threshold value, wherein each seam of the set of seams has a saliency cost below the seam cost threshold value;
    resizing the image based on a set of resizing seams, wherein the set of resizing seams comprises a number of seams equal to the minimum of a number of seams of the determined set of seams and the step size; and
    outputting display data to effect display of the resized image.

11. The computer readable storage device of claim 10, wherein the determined saliency score for each pixel is based on the logo detection saliency value, wherein the determining the saliency score for each pixel comprises comparing regions of the image to a database of logos.

12. The computer readable storage device of claim 10, wherein the determined saliency score for each pixel is based on the text detection saliency value, wherein the determining the saliency score for each pixel comprises:
    determining one or more regions of text within the image using optical character recognition; and
    determining a bounding box for a word based on the determined one or more regions of text.

13. The computer readable storage device of claim 10 storing instructions that cause the one or more data processors to perform operations further comprising:
    outputting an alternative image if the average saliency value is equal to or above the average threshold value.

14. The computer readable storage device of claim 10, wherein the determined saliency score for each pixel is based on the logo detection saliency value, the text detection saliency value, and the face detection saliency value, wherein the saliency score for each pixel is a weighted average of the logo detection saliency value, the text detection saliency value, and the face detection saliency value.

15. The computer readable storage device of claim 10 storing instructions that cause the one or more data processors to perform operations further comprising:
    determining a saliency map for the image comprising the saliency scores for the plurality of pixels of the image and pixel color data.

16. The computer readable storage device of claim 15, wherein the saliency map comprises a matrix of saliency scores and pixel color data, wherein resizing the image comprises manipulation of the matrix of saliency scores and pixel color data.

17. A system for resizing an image content item of a third-party content provider, the system comprising:
    one or more data processors; and
    a computer readable storage device storing instructions that, when executed by the one or more data processors, cause the one or more data processors to perform operations comprising:
    receiving data for an image having a plurality of pixels, a seam cost threshold value, and a step size;

determining a saliency score for each of the plurality of pixels of the image, the saliency score for each pixel is based on at least one of:
a logo detection saliency value,
a text detection saliency value, or
a face detection saliency value;
determining an average saliency value for the image based on the determined saliency scores;
determining a set of seams for the image based on the determined saliency scores if the average saliency value is below an average threshold value, wherein each seam of the set of seams has a saliency cost below the seam cost threshold value;
resizing the image based on a set of resizing seams, wherein the set of resizing seams comprises a number of seams equal to the minimum of a number of seams of the determined set of seams and the step size; and
outputting display data to effect display of the resized image.

18. The system of claim 17, wherein the saliency score for each pixel is based on the logo detection saliency value, the text detection saliency value, and the face detection saliency value, wherein the saliency score for each pixel is a weighted average of the logo detection saliency value, the text detection saliency value, and the face detection saliency value.

19. The method of claim 1, the determined saliency score for each pixel is based on the logo detection saliency value, the text detection saliency value, and the face detection saliency value, wherein the saliency score for each pixel is a weighted average of the logo detection saliency value, the text detection saliency value, and the face detection saliency value.

* * * * *